Aug. 2, 1955 W. SHOCKLEY 2,714,702

CIRCUITS, INCLUDING SEMICONDUCTOR DEVICE

Filed Feb. 16, 1951 2 Sheets-Sheet 1

INVENTOR
W. SHOCKLEY
BY
N. S. Ewing
ATTORNEY

CIRCUITS, INCLUDING SEMICONDUCTOR DEVICE

Filed Feb. 16, 1951 2 Sheets-Sheet 2

INVENTOR
W. SHOCKLEY
BY N. S. Ewing
ATTORNEY 2,714,702

CIRCUITS, INCLUDING SEMICONDUCTOR DEVICE

William Shockley, Madison, N. J., assignor to Bell Telephone Laboratories, Incorporated, New York, N. Y., a corporation of New York Application February 16, 1951, Serial No. 211,212

19 Claims. (Cl. 323—66)

This invention relates to electrical semiconductor devices and, more particularly, to electrical circuits that include a semiconductor device such as the p-n junction that is treated by the present inventor in "The Theory of p-n Junctions in Semiconductors and p-n Junction Transistors," Bell System Technical Journal, July 1949.

A p-n junction appropriate for the purposes of the present invention comprises, typically, an integral body of semiconductive material, such as germanium or silicon, having two contiguous body portions of opposite conductivity types (one of p-type material, the other of n-type) with a thin "transition layer" of material at the interface in which there is a progressive change, or transition, from the degree and type of conductivity characteristic of one body portion to the degree and type of conductivity characteristic of the other body portion. A pair of electrodes providing low-resistance ohmic connections to the two body portions complete the device.

The electrical characteristics of the junction depend markedly on the concentration gradient in the transition layer, that is, on the specific manner in which the conductivity varies from one face thereof to the other. It is known that with a proper relationship between concentration gradient in the transition layer and lifetimes of the charge carriers the device becomes a rectifier. In the "forward" direction of current flow through the junction, resistance is low and the current increases at the usual exponential rate with increase in voltage applied across the electrodes. It has been observed, too, that in the opposite, or reverse, direction resistance is high and only a small "saturation" current appears.

The present invention is based, in part, on the discovery that if the reverse voltage applied to a rectifying p-n junction be increased to sufficiently large values a critical voltage is encountered at which the current increases precipitously with further slight increase in voltage. This phenomenon is possibly attributable to the excitation of electrons directly from the valence band to the conduction band, and the critical voltage at which it sets in may be identified with a critical potential gradient in the transition layer. The critical potential gradient, depending upon the material of which the junction is composed, may exceed 100,000 volts per centimeter.

The reverse-voltage versus current characteristic of the particular device, that is, the relation between reverse-voltage drop across the junction and current flowing through it, may exhibit one or more of several features that are significant for the purposes of the present invention. Above the critical voltage, e. g., the voltage drop across the junction may be remarkably independent of the current over an extended range of current values, and only slightly dependent on temperature. The reverse current below the critical voltage may be small (of the order of microamperes, e. g.) and, for many purposes, negligible; whereas the reverse current above the critical voltage may be hundreds or thousands of times as great. The dynamic, or alternating-current, resistance of the junction above the critical voltage may be many times less than it is below the critical voltage and many times less than the static, or direct-current, resistance.

In accordance with the invention a device of the kind described is associated in an electrical circuit with a source of voltage such that the device operates, at least intermittently and in some cases continuously, above the critical voltage. In a simple embodiment of the invention the device and its associated electrical circuit are arranged to provide a source of constant voltage that can be used as a voltage reference standard much as a "standard cell" is used. A related embodiment comprises an electronic voltage regulating circuit in which one of the devices operates as a voltage reference standard and another as a floating battery and coupling element of low dynamic impedance. In another embodiment the device operates on intermittent voltage pulses of irregular shape or varying amplitude to form pulses that are flat-topped and of constant amplitude. In a further embodiment the device is associated with a transmission line to protect connected apparatus against excessive voltage surges. In still another embodiment the device is used as a wave distorting or detecting element.

The nature of the invention and its various features, objects and advantages will appear more fully on consideration of the embodiments illustrated in the accompanying drawings and hereinafter to be described.

Figure 1:
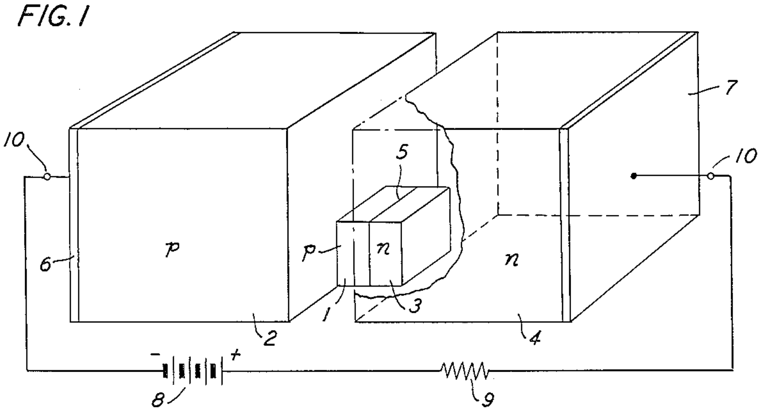
Fig. 1 shows a p-n junction device and electrical circuit associated with it in accordance with the invention constituting a source of substantially constant voltage.

Referring more particularly now to Fig. 1, there is illustrated an embodiment of the invention comprising a rectifying p-n junction made up of an integral body of semiconductive material of which body portions 1 and 2 are of p-type material, and body portions 3 and 4 of n-type material. Body portions 1 and 3 together constitute a short rod of rectangular cross-section with a transition layer 5 midway of its length. Integral with portions 1 and 3 and of respectively the same material, are large end portions 2 and 4, respectively. These are of rectangular cross-section and all of their dimensions are at least several times those of the rod. They are provided at their end faces with metal electrodes 6 and 7, respectively, which provide a low-resistance ohmic connection to the body portions 2 and 4 and, through them, to the opposite faces of the transition layer 5.

In series circuit relation with the junction in Fig. 1 is a direct-current voltage source 8, poled in the "reverse" direction as shown, with its negative terminal connected to electrode 6, and a resistor 9. The potential drop across the device is made available at a pair of terminals 10 which are connected directly to the electrodes 6 and 7.

The rectifying device in Fig. 1 may be fabricated by making use of the method disclosed in the application of G. K. Teal, Serial No. 168,184, filed June 15, 1950 (British Patent 706,858). In accordance with that disclosure a single crystal of semiconductive material is formed progressively by slowly withdrawing some of a molten mass of the material and, at an intermediate point in the formation of the crystal, adding suitable donor or acceptor impurities to the melt to change its conductivity type. One feature of this method is the control it affords over the concentration gradient in the transition layer, i. e., the gradient of the difference between densities of donors and acceptors. By cutting operations a semiconductive structure of the character shown in Fig. 1 is formed.

The relative enlargement of the end portions 2 and 4 tends to increase the heat-dissipating capacity of the device and also to reduce the resistance between each of the electrodes 6, 7 and the transition layer 5. For the latter reason also the length of the rod 1, 3 is kept to a minimum and may be substantially less than the cross-sectional dimensions of the rod. Under these circumstances the voltage appearing at terminals 10 is very nearly the voltage drop across transition layer 5.

Figure 2:
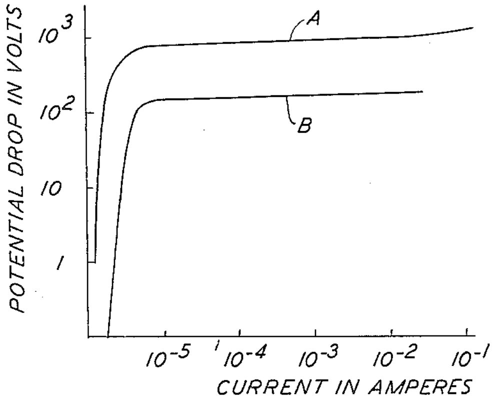
Figs. 2 and 3 are curve diagrams pertaining to Fig. 1.

The reverse-voltage versus current characteristic in two illustrative cases are shown in Fig. 2, which is a log-log plot of the potential drop, in volts, across terminals 6, 7 against the reverse current through the rod, in amperes. (In the forward direction of current flow the current varies with potential drop in the usual manner.) In the reverse direction the current increases slowly as the voltage progressively increases, from a few micro-amperes through a saturation region, until a critical point is reached, corresponding to about 800 volts on curve A and 150 volts on curve B, where the current increases rapidly with further increase in voltage. Over a wide range of current values (of a thousand to one, or more) the curves are nearly flat and the potential drop changes very little. Had a linear current scale been selected for Fig. 2 the sharpness of the transition at the critical voltage would be much more evident but the saturation portion of the curves would be reduced to vertical lines and thereby obscured.

In the specific example to which curve A of Fig. 2 applies, the rod 1, 3 of Fig. 1 was one-eighth inch long and about 20 mils square. The portion 3, of n-type material, comprised high back-voltage germanium having a resistivity of about 5 to 7 ohm-centimeters. The portion 1, of p-type, comprised the same material with gallium present as an impurity and had a resistivity of about one-half ohm-centimeter. The surface of the rod was etched and then treated with antimony oxychloride, all in the manner set forth in the application of J. R. Haynes and R. D. Heidenreich, Serial No. 175,648, filed July 24, 1950. The cross-section of the rod being thereby reduced to about 0.002 square centimeter. After the surface treatment the specimen was dipped in molten ozokerite wax and allowed to cool. The resulting film of wax protects the surface of the specimen from atmospheric changes.

The voltage of the source 8 in Fig. 1 (which may be a regulated rectifier) is kept slightly greater than the critical voltage indicated in Fig. 2. Resistor 9 is chosen with reference to the maximum voltage that source 8 may deliver to limit the maximum current through the p-n junction to a safe value. The resistor contributes also to reduction of the effect of variations in source voltage on the output voltage at terminals 10, and for this purpose its resistance may be as great as a megohm or more. With a 1-megohm resistor in circuit, a reduction in voltage variations of a hundred-fold or more has been observed with a reduction of fractional change by a factor of 20.

In view of the high resistance of the p-n junction in the reverse direction the power dissipated in the junction is relatively high and overheating with consequent impairment of its characteristics may easily occur unless precautions are taken to prevent it. To minimize power dissipation one may confine the operation as much as possible to the left-hand or low-current end of the flat portion of the characteristic shown in Fig. 2. Additionally or alternatively, a cooling blast of air may be directed against the junction, or equivalent cooling means provided. In some cases, too, it will be feasible to operate the junction only intermittently above the critical voltage, as in certain of the embodiments to be described hereinafter.

The critical electric field, or potential gradient, to which reference has been made can be estimated approximately, in the general case, from the theory of Zener for a one dimensional model. According to this theory the probability that an electron in an electric field E be excited in unit time from the valence band to the conduction band is $$(eEa/h)\exp(-\pi^2 maE_G^2/h^2eE)$$

where:

$e$ is the charge of the electron.
$a$ is the lattice constant.
$h$ is Planck's constant.
$m$ is the mass of the electron.
$E_G$ is the energy gap between valence and conduction bands.

(This formula, in slightly different notation, is given in Mott and Jones, "Properties of Metals and Alloys," Oxford at the Clarendon Press, 1936, page 95, equation 15.) This formula is calculated for the case of almost free electrons and for a hypothetical one dimensional crystal. It may be generalized to a form more suitable for semiconductors by using the relationship between the energy gap and the effective mass given by the definition on page 95:

$$\frac{m}{\hbar^2}\frac{d^2E}{dk^2}=\frac{\text{electronic mass}}{\text{effective mass}}=\frac{m}{m^*}$$

together with the equations for almost free electrons given on page 65:

$$E=\frac{\hbar^2}{2m}(\alpha)k_x\pm(\pi/a))^2+k_y^2+k_z^2)$$

$$\alpha=1+(4E/\Delta E)$$

$$E=(\hbar^2/2m)(k_x^2+k_y^2+k_z^2)$$

where $k_Y$ and $k_Z$ are taken as zero to correspond to the one dimensional case. By straightforward manipulation, these equations may be used to obtain $$(eEa/h)\exp(-\pi^2(2m^*)^{1/2}E_G^{3/2}/2eEh)$$

If the field E persists over a distance V/E so as to produce a voltage drop V, then the volume in which electrons may be excited is AV/E where A is the cross-section of the specimen. If there are $n_V$ electrons per unit volume in the valence band the total "Zener" current will be $$I=en_v(AV/E)(eEa/h)\exp(-\pi^2(2m^*)^{1/2}E_G^{3/2}/2eEh)$$

Taking $m^*=m$ and $E_G=0.72$ electron volts, which are approximately correct for germanium, and appropriate values for $n_v$ and $a$, one obtains for a junction of unit area:

$$I \doteq V10^{11}10^{-(10^7/E)}\text{ amp./cm.}^2$$

for V in volts and E in volts per centimeter. For specimens of the sort considered herein V is frequently between 10 and 100 volts, although larger and smaller values occur, and the saturation current is of the order of $10^{-3}$ amp./cm.$^2$. For such cases, the Zener current will exceed the saturation current for $E>10^7/15 \doteq 670{,}000$ volts/cm. From actual experiment it is found that the critical field is somewhat lower, being about 150,000 volts/cm. The difference may be due to the effective mass $m^*$ being smaller than $m$ or due to failure of the one dimensional approximation to apply accurately to the diamond structure of germanium. Since the energy gap of silicon is about 1.5 times as great as for germanium, and since the exponential term varies as $(E_G)^{3/2}/E$, a critical field of 1.85×150,000 could be expected for silicon; but since there may be other differences, such as different effective masses, one should be prepared for a value as high as $10^6$ volts/cm.

The critical fields for other semiconductors can be estimated in a similar way. For values of E larger than the critical value, the current will increase precipitously due to the exponential dependence of I upon E.

The critical voltage of a given p-n junction can be determined directly by applying a reverse voltage to the junction and increasing the voltage until the above-described large increase in current is observed. Alternatively, it can be determined approximately by measuring the concentration gradient of the transition layer and then calculating the voltage required to produce in the layer the critical potential gradient associated with the particular semiconductor material. To measure the concentration gradient, the capacity of the junction at reverse biases is measured and the result interpreted with the aid of equations (2.46) and (2.56) of the cited paper in Bell System Technical Journal.

Figure 3:
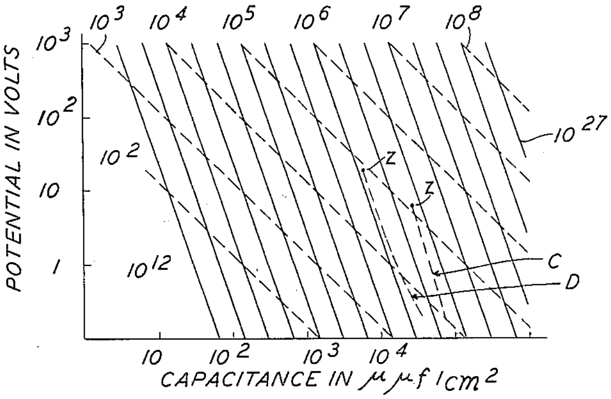

This alternative procedure may be carried out graphically as illustrated on Fig. 3. On this figure the axes are capacity per unit area and voltage in the reverse direction. The solid lines are lines of constant concentration gradient, ranging in value from $10^{12}$/cm.$^4$ to $10^{27}$/cm.$^4$. The dotted lines are lines of constant average field, ranging in value from $10^2$ volts/cm. to $10^8$ volts/cm. The capacity is measured at 1000 cycles per second although other frequencies may be used if more convenient. According to the cited paper, the capacity should vary inversely as the cube root of the voltage with a proportionality factor dependent on the concentration gradient in the junction. For junctions having uniform (i. e. constant) concentration gradients, the electric field distribution is determined from voltage, capacity per unit area and dielectric constant. The relationship is shown on the figure. The dotted lines of constant electric field give the average field in the space charge region of the junction, that is, simply the voltage divided by the width of the space charge region. These lines will apply to any distribution of donor and acceptor densities in the junction. In a junction with a uniform concentration gradient in the space charge region the peak field which occurs at the center of the region is 1.5 times the average field and is within 90 per cent of this peak value for 30 per cent of the thickness of the space charge layer. For such junctions the field for Zener current may thus be taken to be 1.5 times the average field. The relationship of C and V for certain junctions in germanium are shown at C and D in Fig. 3. The extrapolated points marked Z show the voltage at which the precipitous increase in current sets in. These are seen to correspond to a peak electric field of about 150,000 volts/cm. Inasmuch as this value may be different for junctions having the electric fields in different crystallographic directions, a conservative design would be prepared for the use of fields as high as 500,000 volts/cm.

The formula relating the critical voltage $V_c$ to the critical field in volts/cm., the concentration gradient $a$ in cm.$^{-4}$, and dielectric constant K as derived from the theory in the cited reference is $$V_c=(3K/\pi qa)^{1/2}E_{av}^{3/2}$$

where $q$ is the charge on the electron. As discussed above, for curves C and D of Fig. 3 $E_{av}=100,000$ volts/cm. For similar junctions with different values of $a$, this formula may be used to compute V using $E_{av}$ as 100,000 volts/cm. For other materials, appropriate critical fields and values of $a$ would be used.

Although specimens with uniform concentration gradients have been stressed, the same methods are applicable to specimens that change concentrations in different ways.

The difference between curve C and curve D is worthy of special mention. Curve C is for a "highly doped" junction having conductivity of the order of 100 ohm$^{-1}$cm.$^{-1}$ on both sides. This junction was subsequently heat treated at 900° C. for twenty-four hours. The apparent effect of this heat treatment was to cause diffusion of the impurities so as to reduce the concentration gradient from about $4\times10^{21}$ cm.$^{-4}$ to $2\times10^{20}$ cm.$^{-4}$ with a corresponding increase in the critical voltage. This method of producing diffusion by heating can be used to control the critical voltage and to obtain predetermined values by starting with a junction having a lesser critical voltage than is finally desired. It is evident also that this tends to produce a junction which has substantially the same concentration gradient at all points on the surface separating n-type from p-type.

The concentration gradient in the transition layer may be controlled readily if the p-n junction is fabricated in the manner disclosed in the above-mentioned Teal application by controlling the rate at which the conductivity-changing impurities are added, the stirring and the rate of growth of the crystal. A desirable concentration gradient distribution may be promoted by using little or no stirring in the melt and by introducing the impurities directly below the growing crystal; by this means it may be possible to have a lower concentration gradient, and hence weaker fields, at the surface and thus to reduce surface leakage effects.

Figure 4:
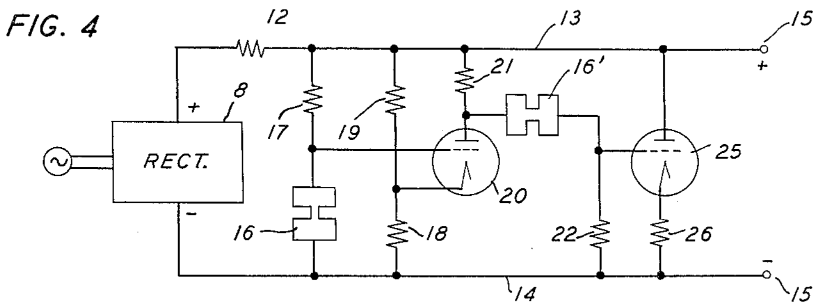
Figs. 4, 5, 6 and 7 show other embodiments of the invention comprising a voltage regulator, a wave shaper, a protective circuit and a detector circuit, respectively.

Referring now to Fig. 4, there is illustrated diagrammatically an electronic power supply unit embodying the present invention. A source 8 of fluctuating direct-current voltage of several hundred volts, for specific example, is shown connected through a resistor 12 and leads 13 and 14 to output terminals 15. A p-n junction device 16 of the kind hereinbefore described is connected in series with a resistor 17 (of 50,000 ohms, for example) across conductors 13, 14, the proportions being such that the device 16 operates in the substantially constant-voltage portion of its characteristic. Also connected in series relation with each other across conductors 13, 14 is a resistor 18 (of 2,000 ohms, for example) and a resistor 19 (of 4,000 ohms, for example). A triode voltage-amplifier tube 20 has its cathode connected to the junction point of resistors 18 and 19, and its control grid connected to the junction of elements 16 and 17 so that the voltage effective across the cathode and grid of triode 20 is the difference between the voltages across elements 16 and 18, respectively. This difference voltage comprises a constant grid biasing component for triode 20 and a fluctuating, or "signal," component corresponding to ripples and other fluctuations in the voltage of source 8. The anode of triode 20 is connected through a resistor 21 (of 50,000 ohms, for example) to the positive conductor 13.

A power triode 25 in Fig. 4 has its anode connected directly to positive conductor 13 and its cathode connected through a resistor 26 (of 100 ohms, for example) to conductor 14.

The control grid of triode 25 is connected through a resistor 22 to the negative conductor 14, and through a second p-n junction device 16' to the anode of triode 20. Device 16' is poled to operate with a reverse voltage across it and, like device 16, it is designed to operate in the constant-voltage portion of its characteristic. Since the static resistance of device 16', and the current flow through it, vary widely with slight changes in the voltage drop across it, the dynamic or alternating-current resistance of the device is low. Thus, the device 16' provides a coupling of low dynamic impedance between triodes 20 and 25, so that the anode of the former and the grid of the latter are held at substantially the same alternating current potential although they differ substantially in direct-current potential. Device 16' also facilitates the proper biasing of the grid of triode 25. The bias for the latter is provided by a voltage drop, negative with respect to the cathode, due to the heavy current flow in resistor 26, and by the series-opposing voltage drop across resistor 22 due to the series connection of elements 21, 16' and 22 across the output conductors 13, 14. Element 16' can be designed to introduce any predetermined voltage drop in the latter connection, thus obviating the need for a battery in the biasing circuit and allowing considerable latitude in the choice of the resistance of resistor 22.

It may be pointed out also that Fig. 4 may be regarded as comprising a two-stage direct-current amplifier which is energized from a constant-voltage source and which is supplied from another source with a signal to be amplified, viz., the fluctuating voltage component appearing in the input circuit of triode 20.

It will be evident to those acquainted with electronic voltage regulators that the circuit illustrated in Fig. 4 tends to maintain the voltage across output terminals 15 substantially constant, notwithstanding variations in the voltage of source 8 or in the impedance of the connected load. It will be understood, too, that the junction device 16 operates much as a voltage regulator tube to increase the relative variation of the potential applied to the grid of triode 20. In contrast to the voltage regulator tube, however, the device 16 is simple, compact, rugged and of indefinitely great service life.

Figure 5:
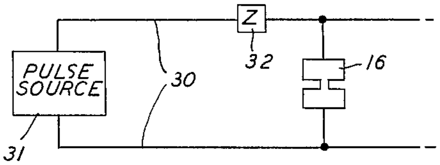
Figure 5A:
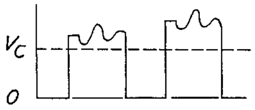
Figs. 5A, 5B and 6A are explanatory diagrams.
Figure 5B:
Figure 5C:
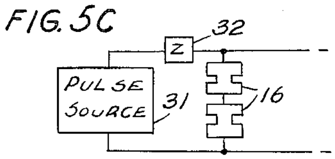
Fig. 5C shows still another embodiment comprising a wave shaper employing two p-n junction devices in series.

Fig. 5 illustrates an embodiment of the invention in which the p-n junction device 16 is shunted across a transmission line 30 to modify the shape of intermittent voltage pulses supplied to the line from a source 31. The voltage pulses transmitted to device 16 may differ somewhat in amplitude and/or each may have a fluctuating amplitude as illustrated diagrammatically in Fig. 5A. The device 16 is so poled that the pulses impress a reverse voltage on it, and the critical voltage of the device is made no greater than the minimum peak voltage of the pulses. The result is that the pulses are reduced to a uniform amplitude as illustrated in Fig. 5B. The effect may be improved in some cases by interposing a series impedance element 32 in the line adjacent device 16, the interposed impedance serving to limit the current through the device 16 to safe values for the highest values of peak voltage from the source. In this embodiment, as in others, a plurality of like-poled, series-connected junction devices 16 may be used in lieu of one as illustrated for this particular embodiment in Fig. 5C.

Figures 6, 6A, 7:
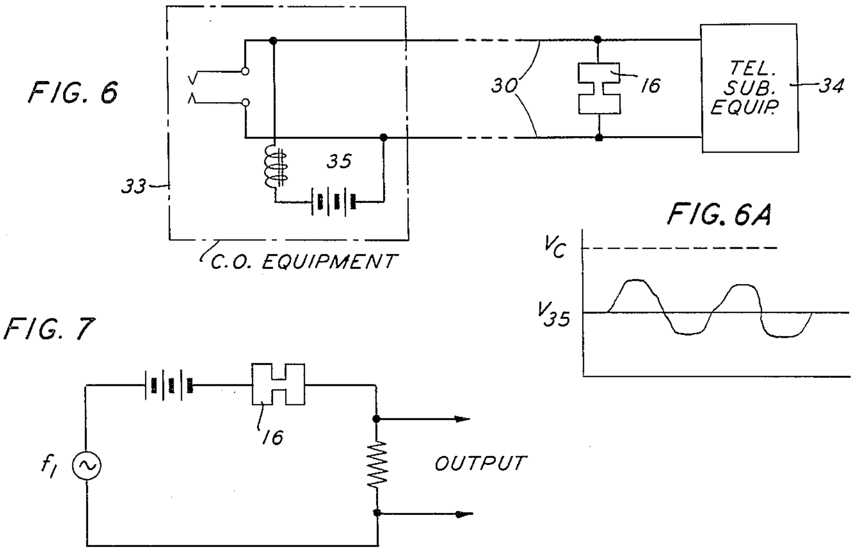

A p-n junction may be used also in accordance with the invention to protect apparatus connected to electrical circuits against voltage surges that might damage the apparatus. In this connection advantage may be taken of both the forward and reverse characteristics of the p-n junction to provide protection for excessive voltages of either polarity. One example is illustrated in Fig. 6 which shows a transmission line 30 leading from telephone central office equipment 33 at the left to telephone subscriber's equipment 34 at the right. Shunted across the line 30 adjacent the equipment 34 is the p-n junction 16. The central office includes conventional apparatus for transmitting message currents to and from the line 30, and also a battery 35 for supplying direct current over the line 30. The battery voltage is made at least somewhat greater than the peak voltage of the message currents applied to line 30 so that the message currents do not at any time produce current transmission in the forward direction through junction 16. The critical reverse voltage of junction 16 is similarly made at least somewhat greater than the sum of the direct-current and signal voltages appearing across its terminals, as in Fig. 6A, so that normally there is only the small saturation current flow in the reverse direction through junction 16. Voltage surges appearing in line 30 due to induction, lightning, transients due to the operation of contacts in the circuit, etc. will now cause junction 16 to conduct freely in one direction or the other, depending on the polarity of the voltage surges, if the latter exceed the operating voltage margins that are provided. The effect of such voltage surges, then, on the equipment 34 is substantially reduced or eliminated.

If, as in Fig. 7 the p-n junction device 16 is provided with a constant reverse voltage, or bias, that is equal to or slightly less than the critical voltage the combination may be used as a rectifier of a superposed alternating voltage or, more generally, as a non-linear circuit element.

In Fig. 7 the combination serves as a detector of signal-modulated carrier waves received from source *fl*. The recovered signal appears, with other modulation products, in the output and may be isolated by known techniques. For high frequency applications it is desirable to have the resistive component of current larger than the reactive component. In a p-n junction biased in the reverse direction the latter arises from the space charge layer as discussed in connection with Fig. 3. The resistive component of current increases with increasing Zener current and may be made to dominate even at microwave frequencies. For example, in a germanium unit with a space charge layer thickness equal to that of curve D of Figure 3, the Zener current exceeds the displacement current at a frequency of $10^{10}$ cycles per second when the current density is greater than 1000 amp./cm.$^2$.

Although the invention has been described largely with reference to certain specific embodiments, it will be appreciated that these embodiments are in part only illustrative and that the invention may be embodied equally well in various other forms.

What is claimed is:

1. In combination, a p-n junction which, for applied reverse voltages greater than a critical reverse voltage, is characterized by a substantially constant voltage region, and, in series circuit relation therewith, a source of variable voltage greater than said critical reverse voltage, and means comprising a resistance element for limiting current flow through said device in said constant voltage region.

2. In combination, a two-terminal electrical element comprising a body of semiconductive material having two contiguous portions of opposite conductivity types and respective terminals in ohmic contact with the two said portions, said element having a reverse voltage-current characteristic including a saturation-current portion and a substantially constant-voltage portion, and means including a source of electrical energy adapted and arranged to drive said element at least intermittently in said constant voltage portion of said characteristic.

3. The combination in accordance with claim 2 wherein said element comprises a p-n junction having a conductivity type transition layer and having a substantially constant voltage region in its reverse voltage-current characteristic for reverse voltages corresponding to potential gradients across said layer exceeding about 100,000 $(E_G/0.7)^{3/2}$ volts per centimeter where $E_G$ is the energy gap of said material.

4. In combination, a semiconductor device comprising a rectifying p-n junction subject to destruction by excessive reverse voltage and having a critical reverse voltage at which a substantially constant voltage characteristic is assumed, and, in circuit relation therewith, means including a voltage source for applying to said junction a reverse voltage that is at least intermittently greater than said critical reverse voltage but less than the voltage required for said destruction.

5. A combination in accordance with claim 4 in which said means comprises a voltage source for applying to said junction a reverse voltage having a direct-current biasing component less than said critical voltage and a superposed variable component, the sum of said biasing and variable components being at least intermittently greater than said critical reverse voltage.

6. A combination in accordance with claim 4 in which said reverse voltage is a fluctuating voltage greater than said critical voltage.

7. A combination in accordance with claim 4 in which the voltage of said source is pulsed.

8. The combination in accordance with claim 7 in which at least some of the pulses of said source have an amplitude exceeding said critical reverse voltage and a duration insufficient to cause said p-n junction to burn out.

9. A combination in accordance with claim 4 in which said means comprises a voltage source for applying to said junction a reverse voltage having a direct-current biasing component substantially equal to said critical voltage and a superposed fluctuating component.

10. The combination in accordance with claim 4 and a second semiconductor device comprising a rectifying p-n junction in series with said first-named device and wherein said voltage source comprises means for applying to at least one of said junctions a reverse voltage that is at least intermittently greater than the critical reverse voltage of said at least one junction.

11. The combination in accordance with claim 10 wherein said source comprises means for applying to said junction reverse voltages that are at least intermittently greater than the critical reverse voltage of each of said junctions.

12. The combination in accordance with claim 10 wherein said junctions are like poled and wherein said source comprises means for applying across said junctions a reverse voltage that is at least intermittently greater than the sum of the critical reverse voltages of said junction.

13. In combination with a direct-current source and output circuit therefor, a regulator comprising a resistance element in said output circuit, a series circuit including said resistance element, a second resistance element and a p-n junction poled to receive a reverse voltage bias from said source, a pair of resistance elements connected across said output circuit, circuit means for deriving the difference in the voltage drops across one of said pair of resistance elements and said p-n junction, a variable impedance element interposed in said output circuit, and circuit means for varying the impedance of said element in accordance with variations in said derived voltage difference.

14. An electrical transmission line subject to voltage surges, means to transmit through said line signals of predetermined peak voltage, apparatus connected to said line which is subject to damage by said surges, and means for preventing said damage which comprise a p-n junction shunted across said line having a predetermined critical reverse voltage greater than said peak voltage but less than the voltage of said damage-causing surges, and means for preventing rectification of said signals by said p-n junction.

15. In combination, two multi-electrode translating devices, a p-n junction galvanically connected between an output electrode of one of said devices and a control electrode of the other, a unidirectional current source galvanically connected between said output electrode and another electrode of said one device, a resistive element galvanically connected in closed series circuit relation with said source and said junction and also galvanically connected between said control electrode and another electrode of said other device.

16. In combination, a pair of translating devices, means comprising an interstage network for applying output signals from one of said devices to the input of the other of said devices, said interstage network including a p-n junction serially connected between said devices and having a critical reverse voltage below burnout at which the reverse voltage-current characteristic of said device changes abruptly from a high resistance characteristic to a substantially constant voltage characteristic, and means for biasing said p-n junction to operate continuously in said constant voltage region.

17. In combination, an amplifying device having a plurality of electrodes, means for applying a biasing potential between two of said electrodes, and means for stabilizing said biasing potential comprising a p-n junction connected between said two electrodes, said p-n junction device having a critical reverse voltage below burnout beyond which further increases in applied reverse voltage achieve relatively negligible increases in the voltage across said device and substantial increases in current flow through said device, said biasing means comprising means for applying to said junction a reverse voltage on the order of said critical reverse voltage, whereby said biasing potentials are stabilized at a value substantially equal to said critical reverse voltage.

18. In combination, a source of fluctuating voltage, a p-n junction having a region of substantially constant voltage in its reverse characteristic for applied reverse voltages greater than a critical reverse voltage, means for applying said fluctuating voltage to said p-n junction, and means for biasing said junction to operate continuously in said constant voltage region.

19. In combination, a source of alternating-current signals, a p-n junction having a critical reverse voltage and a substantially constant voltage characteristic for applied reverse voltages greater than said critical reverse voltage, means for applying to said p-n junction a biasing voltage substantially equal in magnitude to said critical reverse voltage, means for applying said signals to said p-n junction, and means for deriving an output signal from said junction.

References Cited in the file of this patent

UNITED STATES PATENTS

| | | |
|---|---|---|
| 1,325,889 | Curtis | Dec. 23, 1919 |
| 1,741,375 | Niles et al. | Dec. 31, 1929 |
| 2,570,978 | Pfann | Oct. 9, 1951 |